US008687217B2

(12) United States Patent
Jung

(10) Patent No.: US 8,687,217 B2
(45) Date of Patent: Apr. 1, 2014

(54) WIRELESS NETWORK PRINTING SYSTEM AND METHOD CONFIGURED FOR SELECTIVELY CHANGING BETWEEN AN ACCESS POINT COMMUNICATION MODE AND A DIRECT COMMUNICATION MODE

(75) Inventor: Soo Young Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 972 days.

(21) Appl. No.: 12/038,899

(22) Filed: Feb. 28, 2008

(65) Prior Publication Data

US 2008/0225331 A1    Sep. 18, 2008

(30) Foreign Application Priority Data

Mar. 13, 2007   (KR) .................. 10-2007-0024728

(51) Int. Cl.
*G06F 3/12* (2006.01)
(52) U.S. Cl.
USPC .......... 358/1.15; 370/218; 370/244; 370/246; 370/274; 455/421; 455/452.2; 455/456.2
(58) Field of Classification Search
USPC .......................... 358/1.1–3.23; 370/230–400
See application file for complete search history.

(56) References Cited

U.S. PATENT DOCUMENTS

| | | | |
|---|---|---|---|
| 2003/0236064 A1* | 12/2003 | Shiohara et al. | 455/1 |
| 2005/0276253 A1* | 12/2005 | Ho et al. | 370/338 |
| 2006/0128382 A1* | 6/2006 | Kim | 455/434 |
| 2007/0081508 A1* | 4/2007 | Madhavan et al. | 370/338 |
| 2008/0261640 A1* | 10/2008 | Yoshida | 455/517 |

FOREIGN PATENT DOCUMENTS

| | | |
|---|---|---|
| KR | 10-2003-0069447 | 8/2003 |
| KR | 2006-33260 | 4/2006 |
| KR | 10-2006-0088251 | 8/2006 |

OTHER PUBLICATIONS

Office Action, mailed Apr. 4, 2011, in corresponding Korean Application No. 10-2007-0024728 (4 pp.).

* cited by examiner

*Primary Examiner* — Benny Q Tieu
*Assistant Examiner* — Marcellus Augustin
(74) *Attorney, Agent, or Firm* — Staas & Halsey LLP

(57) ABSTRACT

A wireless network printing system and method, the system including: a first wireless terminal to selectively connect to an ad-hoc network, where inter-device communication is directly performed between devices, and an infrastructure network, where inter-device communication is indirectly performed, via an access point (AP); a second wireless terminal to transmit data to the first wireless terminal, via the ad-hoc network; and an image forming device affiliated with the infrastructure network, to print the data, after the data has been relayed through the first wireless terminal.

18 Claims, 6 Drawing Sheets

WIRELESS NETWORK PRINTING SYSTEM AND METHOD CONFIGURED FOR SELECTIVELY CHANGING BETWEEN AN ACCESS POINT COMMUNICATION MODE AND A DIRECT COMMUNICATION MODE

CROSS-REFERENCE TO RELATED APPLICATION

This application claims the benefit of Korean Patent Application No. 2007-24728, filed Mar. 13, 2007, in the Korean Intellectual Property Office, the disclosure of which is incorporated herein by reference.

BACKGROUND OF THE INVENTION

1. Field of the Invention

Aspects of the present invention relate to a wireless network printing system and method. More particularly, aspects of the present invention relate to a wireless network printing system, in which a wireless terminal connected to an ad-hoc network, and located outside of an access point (referred to hereinafter as an AP) of an infrastructure network, can send data to an image forming device connected to the infrastructure network.

2. Description of the Related Art

Presently, the most commonly used wireless network printing environment is provided by a wireless infrastructure local area network (LAN). Such an infrastructure network includes an access point (AP) to connect a wired LAN and a wireless LAN. A user can print desired data on an image forming device equipped with a wireless network card, and connected to the infrastructure network to a sending device, through the AP.

Another wireless network printing environment is provided by a wireless ad-hoc LAN. In such an ad-hoc network, a wireless terminal can directly (not via an AP) print desired data on an image forming device equipped with a wireless network card, and connected to the ad-hoc network.

Wireless network cards can connect to both the infrastructure network and the ad-hoc network. Therefore, a user can specify and use either the infrastructure network or the ad-hoc network.

The infrastructure network provides a LAN service to a wireless terminal, such as, a personal digital assistant (PDA), or notebook computer equipped with a wireless LAN card, using an AP that corresponds to a hub of a wired LAN. The communication modes of the wireless LAN are classified into an infrastructure mode and an ad-hoc mode. In the infrastructure mode, indirect communication is performed using the wireless LAN card, through the AP, and in the ad-hoc mode direct communication is performed using the wireless LAN card. Therefore, in wireless network printing systems, printing can be performed in both modes.

Generally, the communication of Request To Send (RTS) and Clear To Send (CTS) frames, as defined in the IEEE 802.11 standard, are made in the following order. First, a specific wireless terminal transmits a request to send (RTS) frame to an AP, to ask for permission to commence communication. The AP transmits a clear to send (CTS) frame to permit the communication with the specific wireless terminal, and inhibits communications of wireless terminals other than the specific wireless terminal. The specific wireless terminal transmits data packets (DATA) to the AP, and the other wireless terminals wait for an acknowledgement (ACK) frame. The AP broadcasts the ACK frame upon completion of the data transmission, and a channel contention then occurs again among the wireless terminals. That is, the communication is made in the order of RTS→CTS→DATA→ACK.

A conventional wireless network printing system supports the IEEE 802.11b standard. In this standard, a wireless terminal can perform wireless network printing, within an AP, in the infrastructure mode. The nearer the wireless terminal is to the AP, the higher the data rate is. Also, when the wireless terminal is outside of the AP, it cannot perform wireless network printing. In other words, there is a problem that the wireless network printing can be performed in only a limited area, i.e., within the AP.

SUMMARY OF THE INVENTION

Therefore, it is an aspect of the present invention to provide a wireless network printing system where a wireless terminal, located outside of the AP, can send print data to an image forming device on an infrastructure network including the AP, using a different wireless terminal located within the AP, to relay the print data.

In accordance with one aspect of the invention, there is provided a wireless network printing system comprising: an infrastructure network having an access point; a first wireless terminal to selectively change between a direct communication mode, where communication is directly performed between wireless terminals, and an access point communication mode, where communication is performed over a network, via an access point; a second wireless terminal located outside of the access point, to connect with the first wireless terminal, via the direct communication mode; and an image forming device connected to the infrastructure network, via the access point communication mode, The first wireless terminal changes from the direct communication mode, to the access point communication mode, to transmit print data, provided from the second wireless terminal, to the image forming device, via the access point.

According to various embodiments, the direct communication mode may be performed over an ad-hoc network, and the access point communication mode may be performed over an infrastructure network. In the ad-hoc mode, two wireless terminals directly communicate over an ad-hoc wireless network, and in the infrastructure mode a wireless terminal connects to a structural network, through an access point of the structural network.

According to various embodiments, the first wireless terminal may change from the access point communication mode, to the direct communication mode, in response to a request to send print data, from the second wireless terminal. Once the print data is sent, the first wireless terminal changes from the direct communication mode, to the access point communication mode, to transmit the received print data to the image forming device, via the access point.

According to various embodiments, the first wireless terminal may determine whether data received from the second wireless terminal is the print data, and change from the direct communication mode, to the access point communication mode, if the received data is the print data.

According to various embodiments, the first wireless terminal may stop communication based on the direct communication mode, and then change to the access point communication mode.

According to various embodiments, when the first wireless terminal transmits the print data to the access point, the second wireless terminal may receive an ad-hoc Clear To Send (CTS) frame from the first wireless terminal, and wait for a period of time defined in the ad-hoc CTS frame.

According to some embodiments, the first wireless terminal may transmit the print data to the image forming device, via the access point, by: transmitting an infrastructure Request To Send (RTS) frame, and an ad-hoc CTS frame, to the access point; receiving an infrastructure CTS frame from the access point; transmitting an infrastructure data frame, which is the print data, to the access point; and receiving an infrastructure acknowledge (ACK) frame from the access point.

According to various embodiments, the second wireless terminal may transmit the print data to the first wireless terminal by: transmitting an ad-hoc RTS frame to the first wireless terminal; receiving an infrastructure CTS frame, and an ad-hoc CTS frame, from the first wireless terminal; transmitting an ad-hoc data frame, which is the print data, to the first wireless terminal; and receiving an infrastructure ACK frame, and an ad-hoc ACK frame, from the first wireless terminal.

In accordance with another aspect of the invention, there is provided a wireless network printing system having a first wireless terminal, which selectively changes from an ad-hoc mode, where communication is directly performed between wireless terminals over an ad-hoc network, and an infrastructure mode, where communication is performed over an infrastructure network, via an access point, the system comprising: a second wireless terminal located outside of a coverage area of the access point, to connect with the first wireless terminal, via the ad-hoc mode; and an image forming device connected to the network, via the infrastructure mode. The first wireless terminal changes from the infrastructure mode, to the ad-hoc mode, in response to a request to send print data from the second wireless terminal. Once the print data is sent, the second terminal changes from the ad-hoc mode, to the infrastructure mode, to transmit the received print data to the image forming device, via the access point.

According to various embodiments, the first wireless terminal may determine whether data received from the second wireless terminal is the print data, and change from the ad-hoc mode, to the infrastructure mode, if the received data is the print data.

According to various embodiments, when the first wireless terminal transmits the print data to the access point, the second wireless terminal may receive an ad-hoc CTS frame from the first wireless terminal, and wait for a period of time defined in the ad-hoc CTS frame.

According to various embodiments, the first wireless terminal may transmit the print data to the image forming device, via the access point, by: transmitting an infrastructure RTS frame, and an ad-hoc CTS frame, to the access point; receiving an infrastructure CTS frame from the access point; transmitting an infrastructure data frame, which is the print data, to the access point; and receiving an infrastructure ACK frame from the access point.

According to various embodiments, the second wireless terminal may transmit the print data to the first wireless terminal by: transmitting an ad-hoc RTS frame, to the first wireless terminal; receiving an infrastructure CTS frame, and an ad-hoc CTS frame, from the first wireless terminal; transmitting an ad-hoc data frame, which is the print data, to the first wireless terminal; and receiving an infrastructure ACK frame, and an ad-hoc ACK frame, from the first wireless terminal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
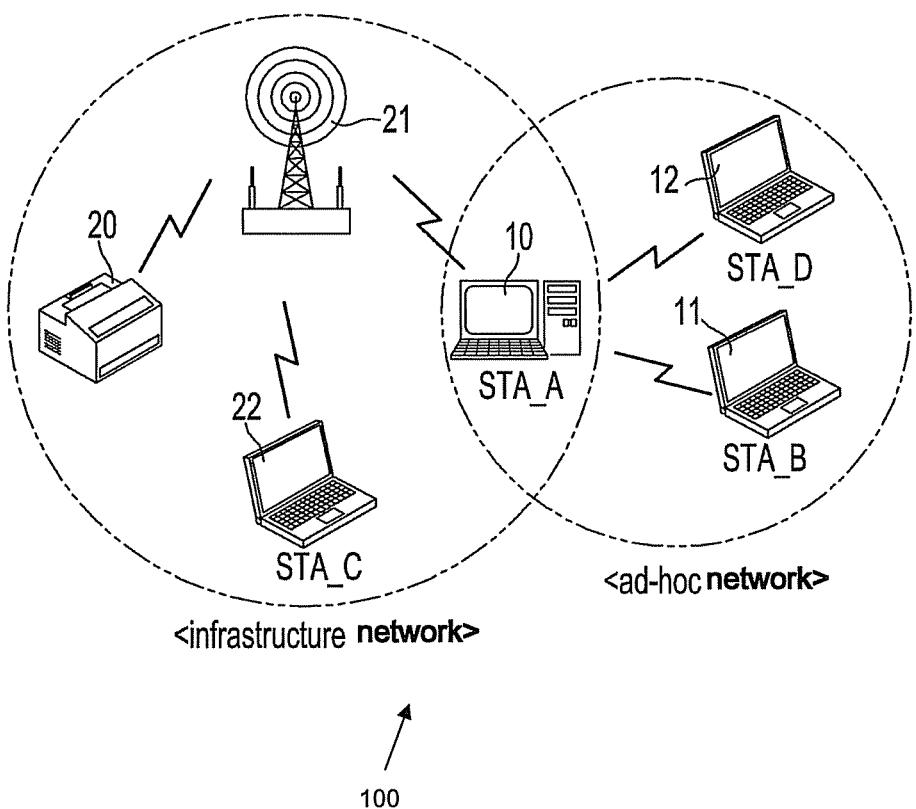
FIG. 1 is a schematic view of a wireless network printing system, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a schematic view of a wireless network printing system 100, according to an exemplary embodiment of the present invention. Referring to FIG. 1, the wireless network printing system 100 comprises a first wireless terminal 10 (STA_A), second wireless terminal 11 (STA_B), and third wireless terminal 12 (STA_D), which communicate in an ad-hoc mode, (i.e. communicate over an ad-hoc network). The respective wireless terminals 10, 11, and 12 communicate directly, i.e., not via a separate central management unit. The wireless network printing system 100 further comprises an image forming device 20, an access point (AP) 21, and a fourth wireless terminal 22 (STA_C), which communicate in an infrastructure mode, (i.e. communicate over an infrastructure network). The first wireless terminal 10 also communicates in the infrastructure mode. The AP 21 acts to connect each of the wireless terminals 10, 20, and 22 with a communication infrastructure (infrastructure network), such that each of the wireless terminals 10, 20, and 22 communicate indirectly, via the AP 21, over the infrastructure network. The AP 21 can be, for example, a wireless hotspot.

In the ad-hoc mode, no separate infrastructure (such as an AP) is required, which allows for the free mobility of each of the wireless terminals 10, 11, and 12. As a result, a user can use a corresponding wireless terminal, while freely moving the terminal within a certain ad-hoc network coverage area. However, this mobility can result in unstable link characteristics.

In the infrastructure network, the components of the infrastructure network should be in place before communication commences over the infrastructure network. However, once the infrastructure network is constructed, the access point of the infrastructure network advantageously provides a wider wireless coverage, and more stable link characteristics, than the ad-hoc network. However, as stated previously, the communication among the wireless terminals is made within only the coverage area of the AP. For this reason, the infrastructure network has a disadvantage, in that wireless terminals located beyond the AP coverage area cannot perform printing using the image forming device. In other words, there is a problem that wireless network printing can be performed in only a limited area: the AP coverage area.

Therefore, according to aspects of the present invention, a wireless node, such as the first wireless terminal 10 of FIG. 1, is provided, which can selectively switch between the infrastructure mode, and the ad-hoc mode, to relay print data. Therefore, a wireless terminal located beyond the AP coverage area can send print data to the image forming device 20.

A method of operating the first wireless terminal 10 (STA_A) will hereinafter be described, with reference to FIG. 2. In operation S100, an image forming device driver is installed in the first wireless terminal 10 (STA_A), which then connects the first wireless terminal 10 with the image forming device 20, while in the infrastructure mode. However, it is understood that such a driver need not be used in all aspects, or can be pre-installed prior to operation S100.

In operation S101, where there is no wireless print job, the first wireless terminal 10 (STA_A) randomly switches between the ad-hoc mode and the infrastructure mode.

In operation S102 the first wireless terminal 10 (STA_A) determines whether there is an ad-hoc connection request from the second wireless terminal 11 (STA_B), or the third wireless terminal 12 (STA_D), connected to an ad-hoc wireless network in the ad-hoc mode. If there is no ad-hoc connection request, the first wireless terminal 10 (STA_A) returns to operation S101. In operation S103, if there is an ad-hoc connection request, the first wireless terminal 10 (STA_A), changes from the infrastructure mode, to the ad-hoc mode, to connect with the second wireless terminal 11 (STA_B), or third wireless terminal 12 (STA_D), over the ad-hoc network formed therebetween.

In operation S104, the first wireless terminal 10 (STA_A) receives wireless data from the second wireless terminal 11 (STA_B), or third wireless terminal 12 (STA_D). In operation S105, upon completion of the wireless data transmission, the first wireless terminal 10 (STA_A), analyzes the received wireless data, to determine whether the received wireless data is print data. If the received wireless data is not print data, the first wireless terminal 10 (STA_A) returns to operation S104. Conversely, if the received wireless data is print data, the first wireless terminal 10 (STA_A) changes from the ad-hoc mode, to the infrastructure mode, in operation S106.

In operation S107, the first wireless terminal 10 (STA_A) transmits the print data received from the second wireless terminal 11 (STA_B), or third wireless terminal 12 (STA_D), to the image forming device 20, through the AP 21. The image forming device 20 then prints the transmitted print data.

Figure 2:
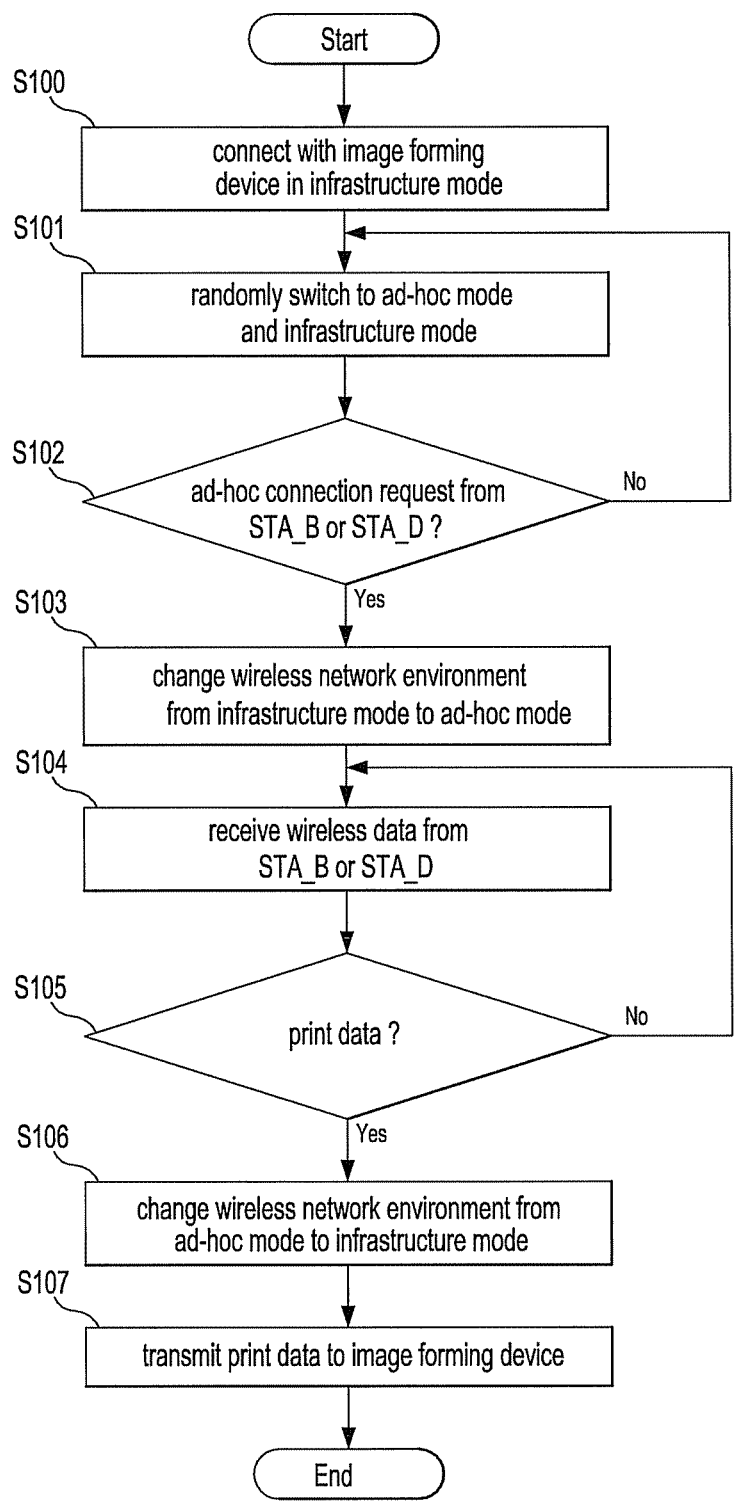
FIG. 2 is a flowchart illustrating the operation of the wireless network printing system of FIG. 1.
Figure 3:
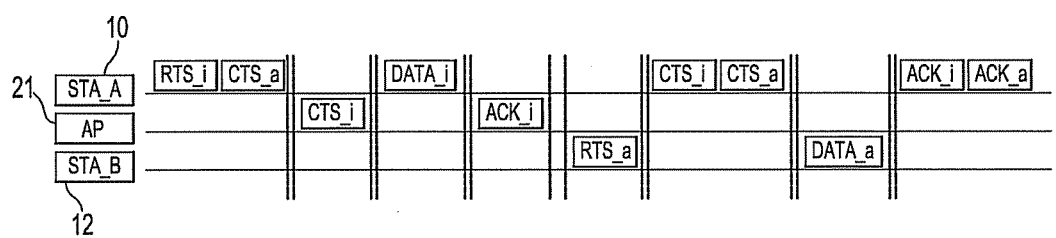
FIG. 3 is a view illustrating an exemplary method of communication among a first wireless terminal STA_A, a second wireless terminal STA_B, and an AP, of FIG. 2.
Figure 4:
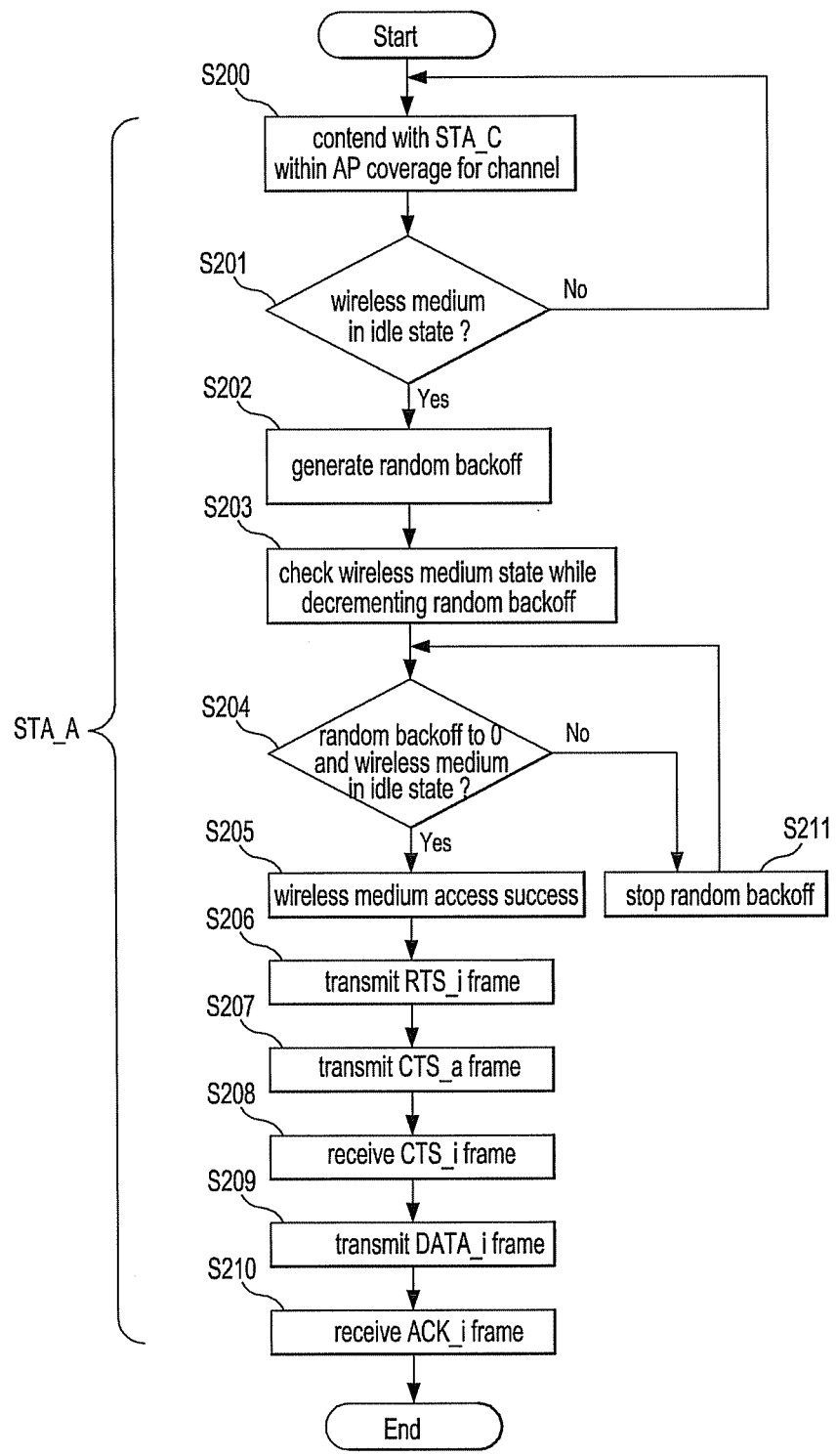
FIG. 4 is a flowchart illustrating a process of the first wireless terminal STA_A in FIG. 2 transmitting print data to an image forming device, through the AP, in an infrastructure mode, according to an aspect of the invention.

FIG. 3 illustrates the order of communication among the first wireless terminal 10 (STA_A), the second wireless terminal 11 (STA_B), and the AP 20, of FIG. 2, and FIG. 4 illustrates a process wherein first wireless terminal 10 (STA_A) of FIG. 2, transmits the print data to the image forming device 20, through the AP 20, while in the infrastructure mode.

Referring to FIG. 4 and FIG. 3, in operation S200, the first wireless terminal 10 (STA_A) contends with a wireless terminal, for example, the fourth wireless terminal 22 (STA_C), connected to the AP 21, for a channel for infrastructure communication with the AP 21.

In operation S201, the first wireless terminal 10 (STA_A) determines whether a wireless medium (channel) is in an idle state. If the wireless medium is not in the idle state, the first wireless terminal 109 STA_A) returns to operation S200. Conversely, if the wireless medium is in the idle state, the first wireless terminal 10 (STA_A) generates a random backoff, in operation S202. The random backoff initiates the transmission of a frame, after the lapse of a defined waiting time (i.e., not transmitting the frame immediately), even though the wireless medium is in the idle state.

In operation S203, the first wireless terminal 10 (STA_A) checks the state of the wireless medium, while gradually decrementing the random backoff. In operation S204, the first wireless terminal 10 (STA_A) determines whether the random backoff has been decremented to "0", and whether the wireless medium is in the idle state. In operation S211, if neither condition is satisfied, the first wireless terminal 10 (STA_A) stops the random backoff, and then returns to operation S204. In operation S205, if the random backoff is "0", and the wireless medium is in the idle state, the first wireless terminal 10 (STA_A) accesses a channel for communication with the AP 21. However, it is understood that operations S202, S203, S204, and S211, need not be performed in all aspects of the invention.

In operations S206 and S207, the first wireless terminal 10 (STA_A) transmits an infrastructure RTS frame RTS_i, and an ad-hoc CTS frame CTS_a, to the AP 21 In operation S208, the first wireless terminal 10 (STA_A) receives an infrastructure CTS frame CTS_i transmitted from the AP 21. In operation S209, upon receiving the infrastructure CTS frame CTS_i from the AP 21, the first wireless terminal 10 (STA_A) transmits an infrastructure data frame DATA_i, which is print data, to the AP 21.

In operation S210, the first wireless terminal 10 (STA_A) receives an ACK frame ACK_i transmitted from the AP 21. Upon receiving the ACK frame ACK_i, the first wireless terminal 10 (STA_A) terminates the print data transmission operation. As a result, the print data transmitted from the first wireless terminal 10 (STA_A) is transferred to the image forming device 20, via the AP 21. This communication procedure is carried out in the order of RTS_i+CTS_a→CTS_i→DATA_i→ACK_i, which satisfies the communication order for Request To Send (RTS) and Clear To Send (CTS) frames, as defined in the IEEE 802.11 standard.

Figure 5:
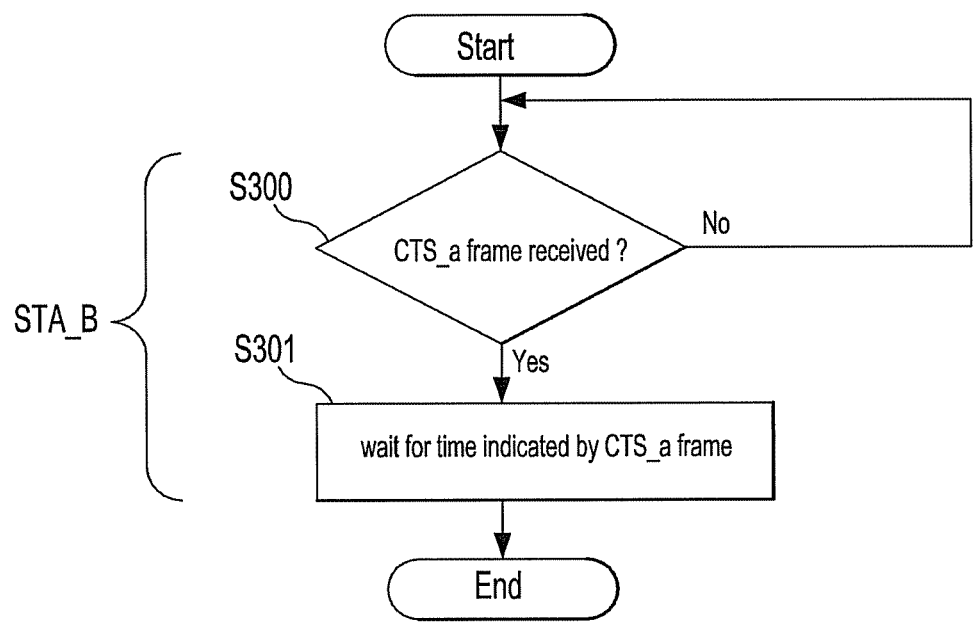
FIG. 5 is a flowchart illustrating the operation of the second wireless terminal STA_B, when the first wireless terminal STA_A in FIG. 2 transmits the print data to the image forming device, through the AP, in the infrastructure mode, according to an aspect of the invention.

FIG. 5 illustrates the operation of the second wireless terminal 11 (STA_B), when the first wireless terminal 10 (STA_A) transmits the print data (data frame DATA_i) in the infrastructure mode, to the image forming device 20, through the AP 21. Referring to FIG. 5 and FIG. 3, in operation S300, the second wireless terminal 11 (STA_B) determines whether the CTS_a frame, transmitted from the first wireless terminal 10 (STA_A) to the AP 21, has been received. If the CTS_a frame has not been received, the second wireless terminal 11 (STA_B) returns to operation S300. In operation S301, if the CTS_a frame has been received, the second wireless terminal 11 (STA_B) waits for a period of time indicated by the CTS_a frame. Accordingly, the second terminal 11 detects that the first terminal 10 has sent the CTS_a frame according to the method of FIG. 4 for purposes of sending print data to an image forming device 20.

Figure 6:
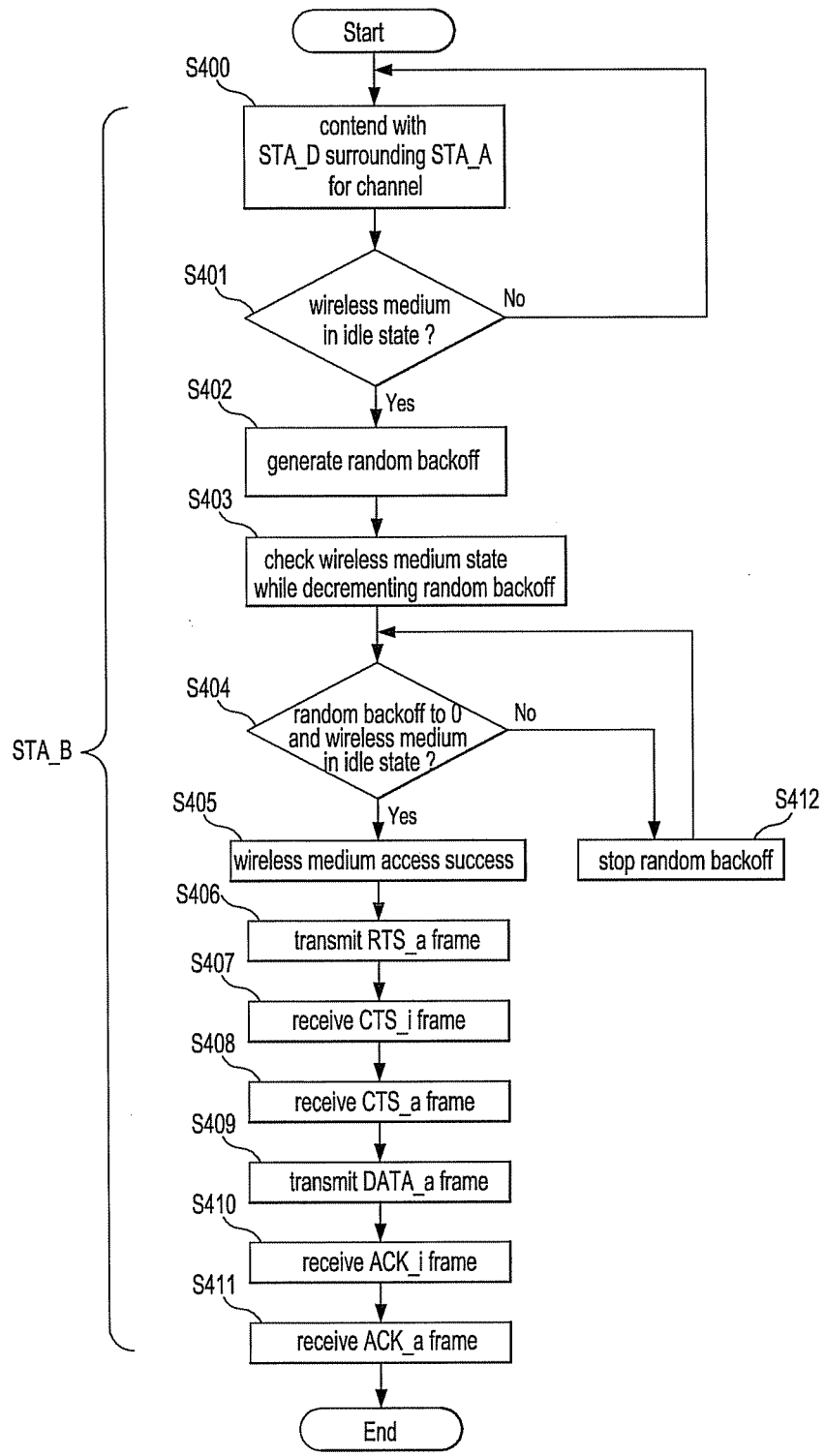
FIG. 6 is a flowchart illustrating a process of the second wireless terminal STA_B of FIG. 2, transmitting print data to the first wireless terminal STA_A, in an ad-hoc mode, according to an aspect of the invention.

FIG. 6 illustrates a process wherein the second wireless terminal 11 (STA_B) transmits, in the ad-hoc mode, print data (data frame DATA_i) to the first wireless terminal 10 (STA_A). Referring to FIG. 6 and FIG. 3, in operation S400, the second wireless terminal 11 (STA_B) contends with the third wireless terminal 12 (STA_D), which connected to the first wireless terminal 10 (STA_A), for a channel for ad-hoc network communication with the first wireless terminal 10

(STA_A). While not required, operation S400 can be performed after operation S301 of FIG. 5 (i.e., after the second terminal 11 determines the first terminal 10 has sent the CTS_a frame to the AP 21 to send print data to an image forming device 20).

In operation S401, the second wireless terminal 11 (STA_B) determines whether a wireless medium is in an idle state. If the wireless medium is not in the idle state, the second wireless terminal 11 (STA_B) returns to operation S400. If the wireless medium is in the idle state, the second wireless terminal 11 (STA_B) generates a random backoff, in operation S402.

In operation S403, the second wireless terminal 11 (STA_B) checks the state of the wireless medium, while gradually decrementing the random backoff. In operation S404, the second wireless terminal 11 (STA_B) determines whether the random backoff has been decremented to "0", and whether the wireless medium is in the idle state. In operation S412, if neither condition is satisfied, the second wireless terminal 11 (STA_B) stops the random backoff, and then returns to operation S404. If the random backoff is "0", and the wireless medium is in the idle state, the second wireless terminal 11 (STA_B) accesses a channel for communication with the first wireless terminal 10 (STA_A), in operation S405. However, it is understood that operations S402, S403, S404, and S412, need not be performed in all aspects of the invention.

In operation S406, the second wireless terminal 11 (STA_B) transmits an ad-hoc RTS frame RTS_a to the first wireless terminal 10 (STA_A). In operations S407 and S408, the second wireless terminal 11 (STA_B) receives an infrastructure CTS frame CTS_i, and an ad-hoc CTS frame CTS_a, from the first wireless terminal 10 (STA_A).

Upon receiving the infrastructure CTS frame CTS_i, and the ad-hoc CTS frame CTS_a, from the first wireless terminal 10 (STA_A), the second wireless terminal 11 (STA_B) transmits an ad-hoc data frame DATA_a, which is print data, to the first wireless terminal 10 (STA_A), in operation S409. In operations S410 and S411, after the ad-hoc data frame DATA_a is transmitted to the first wireless terminal 10 (STA_A), the second wireless terminal 11 (STA_B) receives an infrastructure ACK frame ACK_i, and an ad-hoc ACK frame ACK_a, from the first wireless terminal 10 (STA_A).

Upon receiving the infrastructure ACK frame ACK_i, and the ad-hoc ACK frame ACK_a, from the first wireless terminal 10 (STA_A), the second wireless terminal 11 (STA_B) terminates the print data transmission operation. As a result, the transmission of the print data (data frame DATA_a) from the second wireless terminal 11 (STA_B), to the first wireless terminal 10 (STA_A), is completed. This communication procedure is carried out in the order of RTS_a→CTS_i+CTS_a→DATA_a→ACK_i+ACK_a, which satisfies the communication order of Request To Send (RTS) and Clear To Send (CTS) frames, as defined in the IEEE 802.11 standard.

Therefore, a wireless terminal located outside of an AP coverage area can use a wireless terminal located within the coverage area of the AP 21, to relay the print data to an image forming device connected to the AP. The print data can thereby be printed using the image forming device.

While not required in all aspects, it is understood that aspects of the invention can be implemented as software and/or firmware encoded in computer readable media, to be implemented by one or more processors and/or computers. Moreover, while described in terms of print data, it is understood that aspects of the invention can be applied to other types of data beyond print data sent to an image forming apparatus.

As is apparent from the above description, according to aspects of the present invention, when a first wireless terminal affiliated with an ad-hoc network, where inter-device communication is directly performed between devices, sends print data to an image forming device affiliated with an infrastructure network, where inter-device communication is indirectly performed, via an access point. The first wireless terminal established an ad-hoc network with a wireless terminal affiliated the infrastructure network, and uses the second wireless terminal to relay the print data to the image forming device. Therefore, even a wireless terminal, located beyond the access point coverage area of the infrastructure network, can print data using an image forming device on the infrastructure network.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wireless network printing system comprising:
a first wireless terminal to selectively change between an access point communication mode, wherein communication is performed over a first network, via an access point of the first network, and a direct communication mode, wherein communication is directly performed between wireless devices, over a second network;
a second wireless terminal located outside of a coverage area of the access point, to connect with the first wireless terminal using the direct communication mode; and
an image forming device connected to the first network, using the access point communication mode,
wherein the second wireless terminal requests the first wireless terminal to change to the direct communication mode to send data to the first wireless terminal, and
upon receiving the request from the second wireless terminal, the first wireless terminal changes to the direct communication mode, and receives the data from the second wireless terminal, if the received data is print data, the first wireless terminal changes from the direct communication mode to the access point communication mode and relays the data from the second wireless terminal to the image forming device via the access point.

2. The wireless network printing system according to claim 1, wherein the direct communication mode is an ad-hoc mode and the access point communication mode is an infrastructure mode.

3. The wireless network printing system according to claim 1, wherein the first wireless terminal changes from the access point communication mode, to the direct communication mode, in response to a request to send the data from the second wireless terminal, and upon receiving the data, the first wireless terminal changes from the direct communication mode to the access point communication mode, to transmit the received data to the image forming device, via the access point.

4. The wireless network printing system according to claim 3, wherein the first wireless terminal determines whether the data received from the second wireless terminal is print data, and changes, from the direct communication mode, to the access point communication mode, if the received data is the print data.

5. The wireless network printing system according to claim 3, wherein the first wireless terminal stops communication, based on the direct communication mode, with the second wireless terminal, and then changes to the access point communication mode.

6. The wireless network printing system according to claim 3, wherein the first wireless terminal stops communication based on the access point communication mode, and then changes to the direct communication mode.

7. The wireless network printing system according to claim 1, wherein when the first wireless terminal transmits the data to the access point, the second wireless terminal receives an ad-hoc Clear To Send (CTS) frame from the first wireless terminal, and then waits for a period of time defined in the received ad-hoc CTS frame.

8. The wireless network printing system according to claim 1, wherein when the first wireless terminal transmits the data to the image forming device in the access point communication mode, via the access point, the first wireless terminal: transmits an infrastructure Request To Send (RTS) frame, and an ad-hoc CTS frame, to the access point; receives an infrastructure CTS frame from the access point; transmits an infrastructure data frame, which is print data, to the access point; and receives an infrastructure acknowledge (ACK) frame from the access point.

9. The wireless network printing system according to claim 1, wherein when the second wireless terminal transmits the data to the first wireless terminal in the direct communication mode, the second wireless controller transmits an ad-hoc RTS frame to the first wireless terminal; receives an infrastructure CTS frame and an ad-hoc CTS frame from the first wireless terminal; transmits an ad-hoc data frame, which is print data, to the first wireless terminal; and receives an infrastructure ACK frame, and an ad-hoc ACK frame, from the first wireless terminal.

10. A wireless network printing system having a first wireless terminal which selectively changes between an ad-hoc mode, wherein communication is directly performed between wireless terminals over an ad-hoc network, and an infrastructure mode where communication is performed over an infrastructure network, via an access point of the infrastructure network, the system comprising:
an image forming device connected to the infrastructure network, via the infrastructure mode; and
a second wireless terminal located outside of a coverage area of the access point, to send data to the first wireless terminal using the ad-hoc mode, and to signal the first wireless terminal to change to the infrastructure mode, to send the data to the image forming apparatus, via the access point,
wherein if the sent data is print data the first wireless terminal changes from the ad-hoc mode to the infrastructure mode upon receiving the signal and send the data to the image forming apparatus via the access point.

11. The wireless network printing system according to claim 10, wherein if the second wireless terminal receives an ad-hoc CTS frame from the first wireless terminal, the second wireless terminal waits for a period of time defined in the ad-hoc CTS frame.

12. The wireless network printing system according to claim 10, wherein when the first wireless terminal transmits the data to the image forming device, in the infrastructure mode, the first wireless terminal transmits an infrastructure RTS frame, and an ad-hoc CTS frame, to the access point; receives an infrastructure CTS frame from the access point; transmits an infrastructure data frame, which is print data, to the access point; and receives an infrastructure ACK frame from the access point.

13. The wireless network printing system according to claim 10, wherein when the second wireless terminal transmits the data to the first wireless terminal, in the ad-hoc mode, the second wireless terminal transmits an ad-hoc RTS frame to the first wireless terminal; receives an infrastructure CTS frame, and an ad-hoc CTS frame, from the first wireless terminal; transmits an ad-hoc data frame, which is print data, to the first wireless terminal; and receives an infrastructure ACK frame, and an ad-hoc ACK frame, from the first wireless terminal.

14. A wireless network printing system comprising:
an infrastructure network comprising an access point;
an image forming device connected to the access point;
a first wireless terminal to selectively connect to the infrastructure network, via the access point, and to directly connect to other wireless terminals, via an ad-hoc network; and
a second wireless terminal located outside of a coverage area of the access point, to send data directly to the first wireless terminal, via the ad-hoc network, and to request the first wireless terminal to connect to the infrastructure,
wherein if the sent data is print data, the first wireless terminal connects to the infrastructure network and sends the sent data to the image forming apparatus via the access point.

15. The wireless network printing system according to claim 14, wherein the first wireless terminal receives the print data, via the ad-hoc network, and then connects to the access point, to send the print data to the image forming device, via the infrastructure network.

16. A method of relaying print data through a first wireless terminal, to an image forming apparatus connected to an infrastructure network, comprising requesting the first wireless terminal to change to the ad-hoc mode to send data to the first wireless terminal;
connecting a second wireless terminal directly to the first wireless terminal, via an ad-hoc network;
sending data from the second wireless terminal to the first wireless terminal, via the ad-hoc network;
if the data is print data, switching the first wireless terminal from the ad-hoc mode to the infrastructure mode and sending the sent data from the first wireless terminal to an access point of the infrastructure network, and
sending the print data from the access point to the image forming apparatus, via the infrastructure network.

17. The method of claim 16, wherein the first wireless terminal transmits an ad-hoc Clear To Send (CTS) frame to the second wireless terminal, prior to the second terminal sending the print data and prior to the first terminal switching from the ad-hoc network.

18. A wireless terminal for use in a wireless network printing system including an infrastructure network that is accessed via an access point, and an image forming device connected to the infrastructure network, via the access point, the terminal comprising:
a receiving and transmitting unit which receives a request to switch between an ad-hoc mode and an infrastructure mode from a second wireless terminal, and data from the second wireless terminal, via an ad-hoc network;
a controller to switch to the ad-hoc mode upon receiving the request to control the receiving and transmitting unit to receive the data from the second wireless terminal, via the ad-hoc network, and to control the receiving and transmitting unit to relay the received data to the image forming device, via the infrastructure network, if the received data is print data, by switching to the infrastructure mode and send an ACK frame to the second wireless terminal, after the print data is relayed.

* * * * *

UNITED STATES PATENT AND TRADEMARK OFFICE
CERTIFICATE OF CORRECTION

| | | |
|---|---|---|
| PATENT NO. | : 8,687,217 B2 | Page 1 of 1 |
| APPLICATION NO. | : 12/038899 | |
| DATED | : April 1, 2014 | |
| INVENTOR(S) | : Jung | |

It is certified that error appears in the above-identified patent and that said Letters Patent is hereby corrected as shown below:

In the Claims

Column 8, Lines 67-68, in Claim 5, delete "claim 3," and insert -- claim 4, --, therefor.

Signed and Sealed this
Ninth Day of December, 2014

Michelle K. Lee
*Deputy Director of the United States Patent and Trademark Office*